US009239926B2

(12) United States Patent
Tripp

(10) Patent No.: US 9,239,926 B2
(45) Date of Patent: Jan. 19, 2016

(54) STATIC ANALYSIS FOR DISCOVERY OF TIMING ATTACK VULNERABILITIES IN A COMPUTER SOFTWARE APPLICATION

(75) Inventor: Omer Tripp, Herzliya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 769 days.

(21) Appl. No.: 13/537,497

(22) Filed: Jun. 29, 2012

(65) Prior Publication Data

US 2014/0007240 A1    Jan. 2, 2014

(51) Int. Cl.
| G06F 21/00 | (2013.01) |
| G06F 21/57 | (2013.01) |
| G06F 21/55 | (2013.01) |
| H04L 9/00 | (2006.01) |
| G06F 11/36 | (2006.01) |

(52) U.S. Cl.
CPC .......... *G06F 21/577* (2013.01); *G06F 11/3604* (2013.01); *G06F 21/556* (2013.01); *H04L 9/005* (2013.01)

(58) Field of Classification Search
CPC ...... G06F 21/57; G06F 21/577; G06F 21/556
See application file for complete search history.

(56) References Cited

U.S. PATENT DOCUMENTS

| 7,020,281 B2 | 3/2006 | Vadekar et al. |
| 8,054,967 B2 | 11/2011 | Nonaka et al. |
| 2004/0125950 A1 | 7/2004 | Yen et al. |
| 2007/0277162 A1* | 11/2007 | Tanaka et al. ................. 717/140 |
| 2010/0332578 A1 | 12/2010 | Gopal et al. |
| 2011/0228926 A1* | 9/2011 | Shumow et al. .................. 380/1 |
| 2011/0314454 A1* | 12/2011 | Godefroid et al. ............ 717/131 |
| 2014/0007243 A1 | 1/2014 | Tripp |

FOREIGN PATENT DOCUMENTS

EP    2207087 A1    12/2009

OTHER PUBLICATIONS

Kocher, "Timing Attacks on Implementations of Diffie-Hellman, RSA, DSS, and Other Systems", Proceedings of the 16th Annual International Cryptology Conference on Advances in Cryptology, pp. 104-113, 1996.
Bortz, et al., "Exposing Private Information by Timing Web Applications", Proceedings of the 16th International Conference on World Wide Web, pp. 621-628, 2007.
Brumley, et al., "Remote Timing Attacks are Practical", Proceedings of the 12th Conference on USENIX Security Symposium, vol. 12, 13 pgs., 2003.

(Continued)

*Primary Examiner* — Brandon Hoffman
*Assistant Examiner* — Thong Truong
(74) *Attorney, Agent, or Firm* — Cuenot, Forsythe & Kim, LLC

(57) ABSTRACT

Discovering timing attack vulnerabilities in a computer software application by statically analyzing instructions of a computer software application to identify multiple possible execution paths traversing any of the instructions, calculating, for each of the possible execution paths, a cost associated with the execution of the instructions traversed by the possible execution path, comparing the costs of at least two of the possible execution paths having inputs of the same size, and identifying as a timing attack vulnerability any of the compared possible execution paths whose cost differs, by at least a predetermined amount, from the cost of any other of the compared possible execution paths.

13 Claims, 4 Drawing Sheets

(56) References Cited

OTHER PUBLICATIONS

Van Cuijk, "Timing attacks on RSA", Mar. 20, 2009, [retrieved Jun. 29, 2012] retrieved from the Internet: <www.phedny.net/papers/Timing%20attacks%20on%20RSA.pdf>, 5 pgs.

Dhem, et al., "A practical implementation of the timing attack", Proceedings of the The International Conference on Smart Card Research and Applications, pp. 167-182, Jun. 15, 2000.

Kocher, "Cryptanalysis of Diffie-Hellman, RSA, DSS, and other systems using timing attacks", Advances in Cryptology, CRYPTO '95, 15th Annual International Cryptology Conference, Dec. 7, 1995, 6 pgs.

Hevia, et al., "Strength of two data encryption standard implementations under timing attacks", Journal ACM Transactions on Information and System Security (TISSEC), vol. 2, Issue 4, pp. 416-437, Nov. 1999.

\* cited by examiner

```
Let s₀ = 1
For k=0 upto w-1
    If (bit k of x) is 1 then
        Let Rₖ = (sₖ · y) mod n
    Else
        Let Rₖ = sₖ
    Let sₖ₊₁ = (Rₖ)² mod n
EndFor
Return (Rw-1)
```

STATIC ANALYSIS FOR DISCOVERY OF TIMING ATTACK VULNERABILITIES IN A COMPUTER SOFTWARE APPLICATION

FIELD OF THE INVENTION

The present invention relates to computer software application testing in general.

BACKGROUND OF THE INVENTION

One well-known approach to defeating cryptographic security systems involves gathering information related to the observable external behavior of such systems during their operation. A timing attack is one such approach in which differences in the time required to perform different operations within a cryptographic algorithm are analyzed in order to deduce an input to the algorithm, typically in the form of a cryptographic key.

SUMMARY OF THE INVENTION

In one aspect of the invention a method is provided for discovering timing attack vulnerabilities in a computer software application by statically analyzing instructions of a computer software application to identify multiple possible execution paths traversing any of the instructions, calculating, for each of the possible execution paths, a cost associated with the execution of the instructions traversed by the possible execution path, comparing the costs of at least two of the possible execution paths having inputs of the same size, and identifying as a timing attack vulnerability any of the compared possible execution paths whose cost differs, by at least a predetermined amount, from the cost of any other of the compared possible execution paths.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIG. 3 is a simplified code snippet illustrating exemplary operation of the system of FIG. 1 and method of FIG. 2.

DETAILED DESCRIPTION OF THE INVENTION

Figure 1:
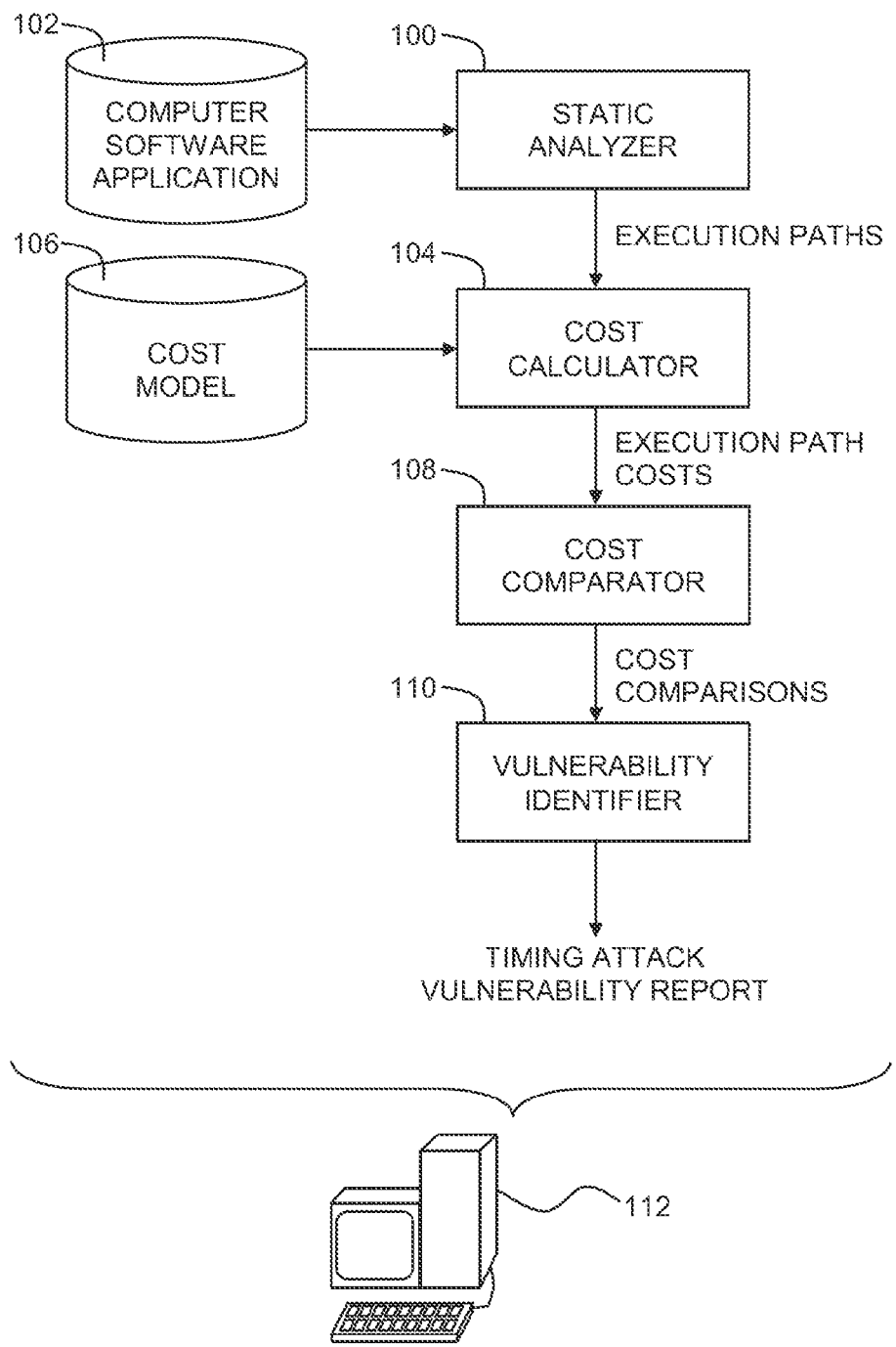
FIG. 1 is a simplified conceptual illustration of a static analysis system for discovery of timing attack vulnerabilities in a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a static analysis system for discovery of timing attack vulnerabilities in a computer software application, constructed and operative in accordance with an embodiment of the invention. In the system of FIG. 1 a static analyzer 100 is configured to statically analyze the instructions of a computer software application 102 to identify possible execution paths traversing any of the instructions. Static analyzer 100 preferably statically analyzes computer software application 102 in accordance with conventional symbolic analysis techniques and is configured to collect symbolic constraints during traversal of the identified possible execution paths. Thus, using symbolic analysis static analyzer 100 preferably models the identified possible execution paths using a finite and small number of inputs. For example, given the statement "if x<50 then . . . else . . . " in an execution path, rather than modeling all possible values of x, only two values may be used, such as 0 and 60, using the symbolic constraint "x<50".

A cost calculator 104 is configured to calculate, for each of the possible execution paths, a cost associated with the execution of the instructions traversed by the possible execution path. Cost calculator 104 preferably calculates each cost using a predefined cost model 106 for the instructions of computer software application 102 and expresses each cost in units of time. A cost comparator 108 is configured to compare the costs of any of the possible execution paths with respect to an input of a given size to the possible execution paths at a given entry point that is common to the possible execution paths whose costs are being compared.

A vulnerability identifier 110 is configured to identify as a timing attack vulnerability any of the possible execution paths, in a given comparison of possible execution paths, whose cost differs by at least a predetermined amount from the cost of any other of the possible execution paths in the given comparison. Vulnerability identifier 110 is preferably configured to report, via a computer-controlled output device such as a computer display or printer, any of the possible execution paths it identifies as a timing attack vulnerability.

Any of the elements shown in FIG. 1 are preferably implemented by one or more computers, such as computer 112, in computer hardware and/or in computer software embodied in a non-transitory, computer-readable medium in accordance with conventional techniques.

Figure 2:
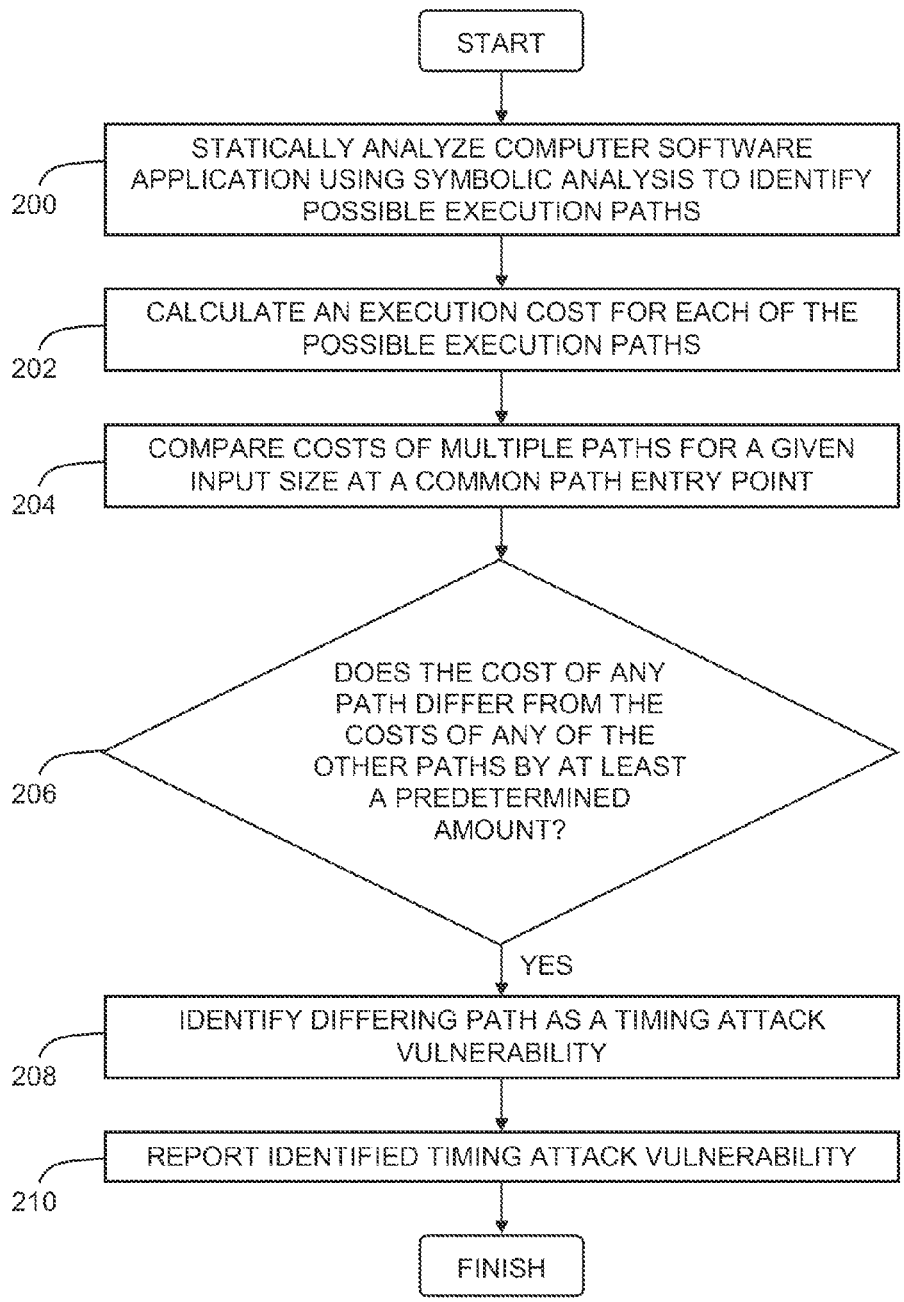
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, the instructions of a computer software application are statically analyzed, preferably using conventional symbolic analysis techniques, to identify possible execution paths traversing any of the instructions (step 200). A cost is calculated for each of the possible execution paths, where each cost is associated with the execution of the instructions traversed by the possible execution path (step 202). The costs of any of the possible execution paths are compared with respect to an input of a given size to the possible execution paths (step 204). Any of the possible execution paths, in a given comparison of possible execution paths, whose cost differs by at least a predetermined amount from the cost of any other of the possible execution paths in the given comparison (step 206), is identified as a timing attack vulnerability (step 208). Possible execution paths that are identified as timing attack vulnerabilities are preferably reported as such via a computer-controlled output device such as a computer display or printer (step 210).

The system of FIG. 1 and method of FIG. 2 may be illustrated by way of example with reference to FIG. 3, in which a modular exponentiation algorithm 300 that is often used in cryptography computes $R=y^x$ mod n, where x is w bits long. The goal of a timing attack on algorithm 300 is to find x, which represents a secret key. This may be achieved while eavesdropping on an interactive protocol that employs algorithm 300, by recording an encrypted message received by a user who employs algorithm 300 when decrypting the message, and measuring the amount of time required by algorithm 300 to respond to each y. The system of FIG. 1 and method of FIG. 2 uncovers this vulnerability as follows:

1. An input size is set. In this example, the input is x, the secret key, and the input size is the number of bits comprising x.
2. Static symbolic analysis of the algorithm 300 is performed. Since algorithm 300 makes a branching decision for each bit based on whether or not the bit is set, the symbolic analysis follows the same pattern. The analysis applies a predefined cost model to the operations in each branch to determine the total execution cost of each branch, expressed in units of time.
3. The analysis analyzes the execution times for different symbolic values. If the execution time for one branch exceeds that of another branch by a predefined threshold, the branch is identified as vulnerable to timing attacks, and this is reported to a user.
4. If no timing attack vulnerability is detected for a given input size, the analysis may be repeated for one or more different input sizes until a timing attack vulnerability or until a termination condition is reached, such as after a predefined number of iterations or after a predefined length of time has passed since the analysis began.

Thus, if the initial input size is set to 2, x is symbolically modeled as $[x_1, x_2]$. Upon entering the first iteration of the loop, the analysis splits the explored state space according to the branching criterion in the body of the iteration by tracking

[$x_1,x_2$] where $x_1=1$ into the true branch; and

[$x_1,x_2$] where $x_1=0$ into the false branch.

The true branch performs multiplication, which is more costly that the assignment in the false branch, and therefore the cost associated with [$x_1,x_2$] where $x_1=1$ is higher than the cost associated with [$x_1,x_2$] where $x_1=0$.

An analogous pattern follows in a subsequent iteration, where the state space is split again. The analysis now tracks four symbolic values:

[$x_1,x_2$] where $x_1=1$ and $x_2=1$, which flows into the true branches for both the first and the second iterations;

[$x_1,x_2$] where $x_1=0$ and $x_2=1$, which flows into the false branch for the first iteration, and into the true branch for the second iteration;

[$x_1,x_2$] where $x_1=1$ and $x_2=0$, which flows into the true branch for the first iteration, and into the false branch for the second iteration; and

[$x_1,x_2$] where $x_1=0$ and $x_2=0$, which flows into the false branch for both the first and the second iterations.

This yields, overall, three possible costs for an input of size 2: The highest cost corresponds to [$x_1,x_2$] where $x_1=1$ and $x_2=1$. Then there is the cost of an input where only one bit is set to 1. Finally, the lowest cost corresponds to [$x_1,x_2$] where $x_1=0$ and $x_2=0$.

Based on these differences, the analysis concludes that algorithm 300 is vulnerable to a timing attack, and reports this to a user. If the threshold value is not crossed for an input of size 2 because there are too few iterations, the analysis may be repeated by inspecting symbolic inputs of length 3, 4, etc.

Figure 4:
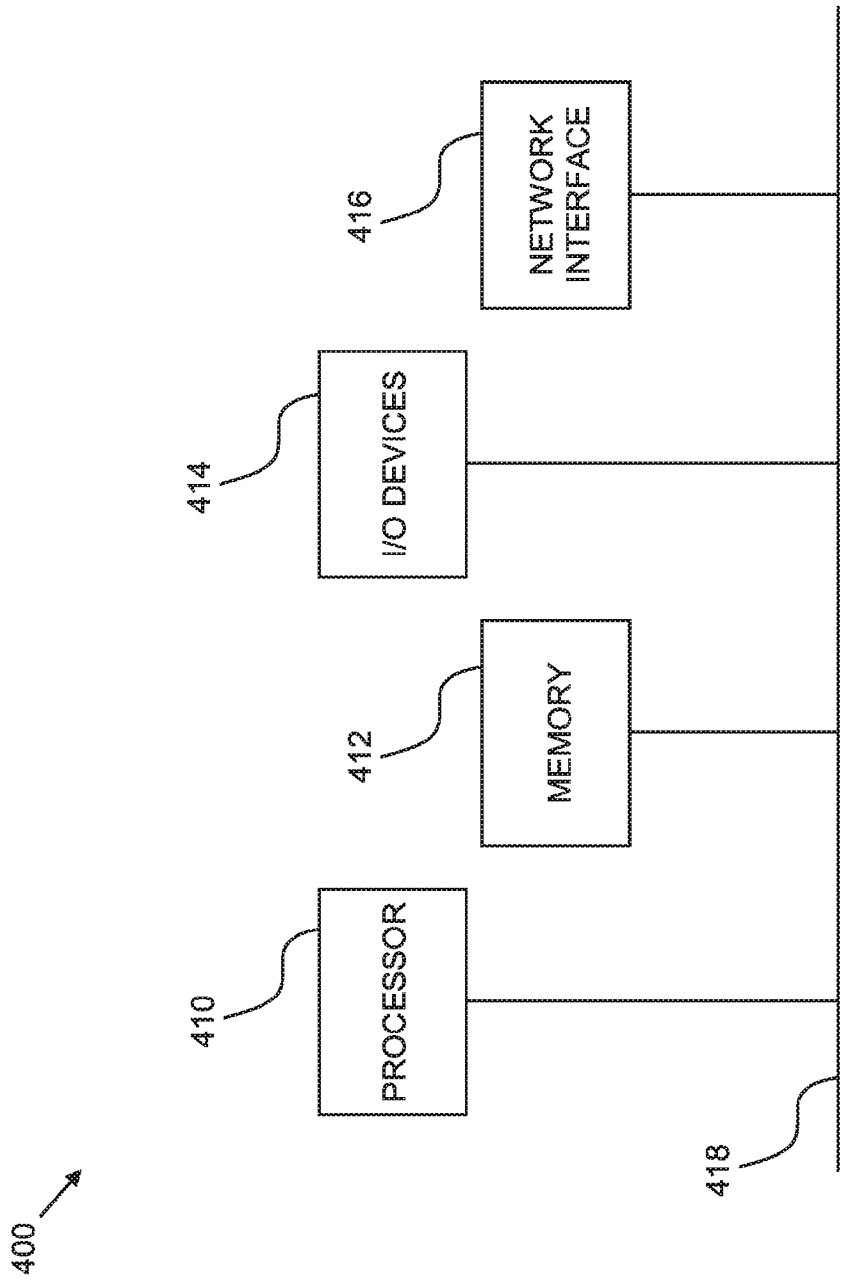
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for discovering timing attack vulnerabilities in a computer software application, the system comprising:
a microprocessor including:
a static analyzer configured to statically analyze instructions of a computer software application to identify a plurality of possible execution paths traversing any of the instructions;
a cost calculator configured to calculate, for each of the possible execution paths, a cost associated with the execution of the instructions traversed by the possible execution path;
a cost comparator configured to compare the costs of at least two of the possible execution paths having inputs of the same size; and
a vulnerability identifier configured to identify as a timing attack vulnerability any of the compared possible execution paths whose cost differs, by at least a predetermined amount, from the cost of any other of the compared possible execution paths.

2. The system according to claim 1 wherein the static analyzer is configured to perform a symbolic analysis of the computer software application.

3. The system according to claim 2 wherein the static analyzer is configured to collect symbolic constraints during traversal of the possible execution paths.

4. The system according to claim 1 wherein the cost calculator is configured to calculate using a cost model for the instructions of the computer software application.

5. The system according to claim 1 wherein the cost calculator is configured to calculate, for each of the possible execution paths, a cost associated with a time, as expressed in time units, of the execution of the instructions traversed by the possible execution path.

6. The system according to claim 1 wherein the vulnerability identifier is configured to report, via a computer-controlled output device, any of the possible execution paths identified as a timing attack vulnerability.

7. The system according to claim 1 wherein any of the statically analyzer, cost calculator, cost comparator, and vulnerability identifier are implemented in any of
a) computer hardware, and
b) computer software embodied in a non-transitory, computer-readable medium.

8. A computer program product for discovering timing attack vulnerabilities in a computer software application, the computer program product comprising:
a computer-readable storage device;
and computer-readable program code embodied in the computer-readable storage device, wherein the computer-readable program code is configured to
statically analyze instructions of a computer software application to identify a plurality of possible execution paths traversing any of the instructions,
calculate, for each of the possible execution paths, a cost associated with the execution of the instructions traversed by the possible execution path,
compare the costs of at least two of the possible execution paths having inputs of the same size, and
identify as a timing attack vulnerability any of the compared possible execution paths whose cost differs, by at least a predetermined amount, from the cost of any other of the compared possible execution paths.

9. The computer program product according to claim 8 wherein the computer-readable program code is configured to perform a symbolic analysis of the computer software application.

10. The computer program product according to claim 9 wherein the computer-readable program code is configured to collect symbolic constraints during traversal of the possible execution paths.

11. The computer program product according to claim 8 wherein the computer-readable program code is configured to calculate using a cost model for the instructions of the computer software application.

12. The computer program product according to claim 8 wherein the computer-readable program code is configured to calculate, for each of the possible execution paths, a cost associated with a time, as expressed in time units, of the execution of the instructions traversed by the possible execution path.

13. The computer program product according to claim 8 wherein the computer-readable program code is configured to report, via a computer-controlled output device, any of the possible execution paths identified as a timing attack vulnerability.

* * * * *